Nov. 17, 1953
T. F. GOLDMANN
2,659,272
DENTAL MIRROR HAVING A REPOLISHABLE LIGHT
TRANSMITTING PLASTIC COVER DISK
Filed Dec. 8, 1951
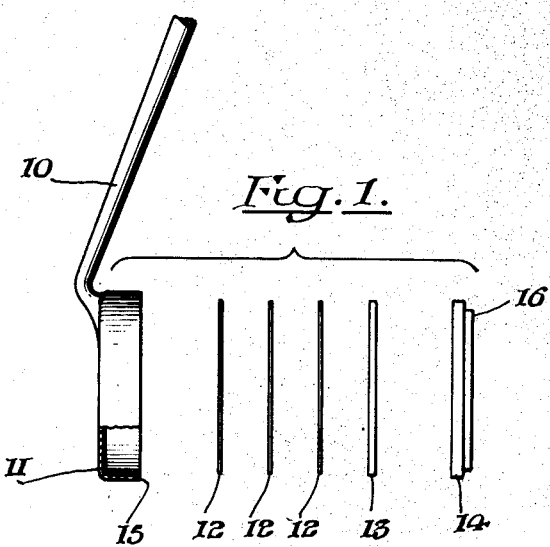
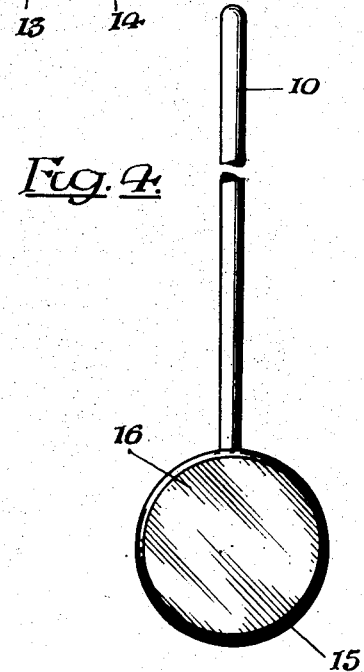
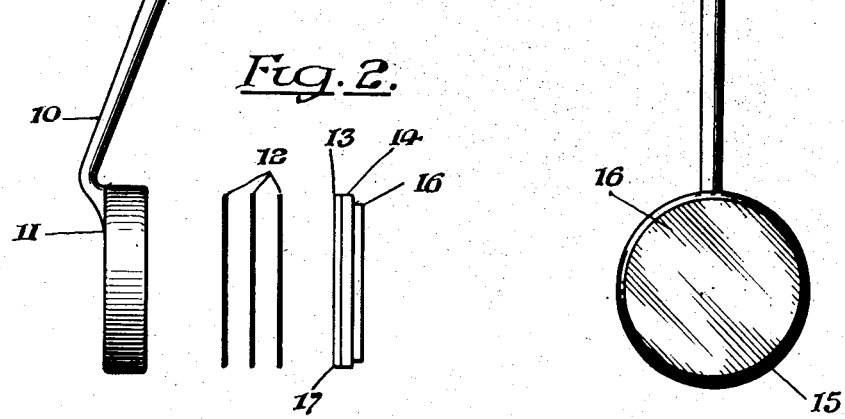
Inventor:
Theodore F. Goldmann
by his Attorneys,
Darby & Darby Patented Nov. 17, 1953

2,659,272

UNITED STATES PATENT OFFICE 2,659,272

DENTAL MIRROR HAVING A REPOLISH-ABLE LIGHT TRANSMITTING PLASTIC COVER DISK

Theodore F. Goldmann, Mamaroneck, N. Y.

Application December 8, 1951, Serial No. 260,717

2 Claims. (Cl. 88—104)

The present invention relates to mirrors and particularly to mirrors which are subject to abrasive effects on their outer surfaces and which must therefore be frequently repolished.

In the past, the outer surfaces of most mirrors have been glass and when the surface was scratched or abraded the mirror was discarded. In many instances this discarding was complete waste since the mirror, aside from the damaged outer surface, was entirely usable.

An example of mirrors subject to such scratching and abrasive effects is the small hand mirror used by dentists. Such mirrors have always been to a certain extent subject to scratching, but today more than ever the mirrors are rendered useless in a very short time during the recently developed method of drilling teeth by means of an air blast of abrasive particles.

My invention therefore comprises a mirror the outer surface of which is formed of plastic such as Lucite which may be readily buffed and polished. As a result, when a mirror such for example as a dental mirror has been pitted and eroded as a result of the air blast used, it may simply be buffed for a few seconds and returned to use.

It is an object of my invention to provide a mirror having an outer surface which may be readily repolished.

It is another object of the invention to provide such a mirror wherein the plastic surface may be silvered on its rear to form a mirror of the usual type or in the alternative a highly polished metallic surface may be utilized as the mirror and a plastic protective layer be placed in front of the metallic surface to protect it, the plastic being readily repolished when it has become abraded.

Other objects and features of the invention will be apparent when the following description is considered in connection with the annexed drawings, in which, Figure 1 is an exploded view of a dental mirror made in accordance with my invention, the view being in section and showing a polished metal reflecting surface together with a plastic protecting member; and Figure 2 is a view similar to Figure 1 showing a mirror in which the reflecting surface is provided by silvering the rear surface of a disk of plastic material.

Figure 3 is a side elevational view, partly in section, of a portion of the mirror; and Figure 4 is a front elevational view of the mirror.

Referring now to the drawings and particularly to Figure 1, there is shown therein an exploded view of the parts which make up a dental mirror in accordance with my invention. These parts comprise the usual handle 10 having a shallow cup-shaped member 11 formed integrally therewith together with a number of backing or cushioning disks 12 which are normally made of cardboard fibre or the like. Additional parts are the polished metal reflecting disk 13 and the plastic protective disk 14. After the parts have been assembled with the disks 12, 13 and 14 within the shallow cup 11 the rim 15 of cup 11 is turned over by spinning or otherwise to form a lip to hold the parts in place.

As indicated in Figure 1 the plastic disk 14 is provided with a reduced portion 16 at its forward edge, which portion protrudes beyond the surface of the rim 15 of cup 11 so that the surface of the plastic may be readily buffed, for example, on a motor driven buffer wheel.

Thus when the mirror of my invention has been in use for a period of time such that the outer surface becomes pitted due to the air blast mentioned above or for other reasons, it may be buffed for a few seconds and is then as completely useful as it was when new.

In Figure 2 I have shown the second embodiment of my invention which is similar to Figure 1 and is therefore given the same reference characters, the only difference is that in Figure 2 the plastic disk 14 is provided with a silvered rear surface designated as 17 which replaces the separate polished metallic reflector 13. The silvered layer may be deposited in any of the well known methods such for example as by electroplating.

In either of the forms of my invention described above the plastic utilized may be of any one of a number of known plastics, but must of course be transparent although it may be tinted if desired. Examples of plastics which are available are Lucite and cellulose acetate.

While I have described my invention primarily with relation to dental mirrors it will be understood that the invention is equally applicable to other mirrors which are subject to deterioration as a concomitant to conditions such as sand blast, etc.

What is claimed is:

1. A dental mirror having a mirror retaining cup-shaped member and a handle connected thereto, a plastic protective disk held by said cup-shaped member, said disc being sufficiently soft so as to be readily polishable to a smooth light-transmitting surface when buffed, a light reflecting mirror surface beneath said plastic protective disc, and positioned within said cup-shaped member, said plastic protective disc being mounted and retained within said cup-shaped member by means of inwardly turned flanges on the upper rim of said cup-shaped member extending over the edges of said disc, said disc having a reduced portion smaller in diameter than the main disc portion thereof extending beyond the upper edge of said cup-shaped member and above said reflecting mirror surface whereby the light-transmitting surface of said disc extends beyond said upper edge of said cup-shaped member to facilitate the buffing and polishing thereof.

2. A dental mirror of claim 1 in which the reflecting mirror surface comprises a silvered rear surface of said plastic protective disc.

THEODORE F. GOLDMANN.

References Cited in the file of this patent
UNITED STATES PATENTS

| Number | Name | Date |
|---|---|---|
| 516,092 | Hills | Mar. 6, 1894 |
| 621,360 | Miller | Mar. 21, 1899 |
| 893,293 | Wright et al. | July 14, 1908 |
| 2,047,253 | Brooks | July 14, 1936 |
| 2,079,048 | Spencer | May 4, 1937 |
| 2,140,005 | Greenberg | Dec. 13, 1938 |
| 2,179,491 | Cain | Nov. 14, 1939 |
| 2,230,369 | Wise | Feb. 4, 1941 |